United States Patent
Gonze et al.

(10) Patent No.: US 8,635,862 B2
(45) Date of Patent: Jan. 28, 2014

(54) CONTROL SYSTEM FOR REDUCING NITROUS OXIDE ("N$_2$O") AFTER SELECTIVE CATALYTIC REDUCTION ("SCR") DEVICE LIGHT-OFF

(75) Inventors: Eugene V. Gonze, Pinckney, MI (US); Chang H. Kim, Rochester, MI (US); Michael J. Paratore, Jr., Howell, MI (US); Steven J. Schmieg, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 136 days.

(21) Appl. No.: 13/418,680

(22) Filed: Mar. 13, 2012

(65) Prior Publication Data

US 2013/0239552 A1 Sep. 19, 2013

(51) Int. Cl.
*F01N 3/10* (2006.01)

(52) U.S. Cl.
USPC .................. 60/301; 60/284; 60/286; 60/300; 60/303

(58) Field of Classification Search
USPC ............ 60/284, 285, 286, 299, 300, 301, 303
See application file for complete search history.

(56) References Cited

U.S. PATENT DOCUMENTS

| | | | |
|---|---|---|---|
| 8,132,403 B2 * | 3/2012 | Toshioka et al. | 60/286 |
| 8,347,604 B2 * | 1/2013 | Hagimoto et al. | 60/277 |
| 8,464,517 B2 * | 6/2013 | Fujita | 60/287 |
| 8,534,050 B2 * | 9/2013 | Yanakiev et al. | 60/286 |
| 2010/0192547 A1 * | 8/2010 | Yabe et al. | 60/286 |

* cited by examiner

*Primary Examiner* — Binh Q Tran
(74) *Attorney, Agent, or Firm* — Cantor Colburn LLP

(57) ABSTRACT

An exhaust gas treatment system for an internal combustion engine is provided having an exhaust gas conduit, an oxidation catalyst ("OC") device, a selective catalytic reduction ("SCR") device, and a control module. The internal combustion engine has at least one operating parameter. The exhaust gas conduit is in fluid communication with, and is configured to receive an exhaust gas from the internal combustion engine. The exhaust gas contains oxides of nitrogen ("NO$_x$") and hydrocarbons. The exhaust gas has an exhaust gas temperature. The OC device is in fluid communication with the exhaust gas conduit, and is activated to induce oxidation of the hydrocarbons in the exhaust gas. The OC device has an oxidation catalyst compound disposed thereon that is selectively activated at a specified temperature range for converting nitrogen oxide ("NO") to nitrogen dioxide ("NO$_2$") at a specified percentage.

19 Claims, 2 Drawing Sheets

CONTROL SYSTEM FOR REDUCING NITROUS OXIDE ("$N_2O$") AFTER SELECTIVE CATALYTIC REDUCTION ("SCR") DEVICE LIGHT-OFF

FIELD OF THE INVENTION

Exemplary embodiments of the invention relate to exhaust gas treatment systems for internal combustion engines and, more particularly, to an exhaust gas treatment system that adjusts the operating parameters of an internal combustion engine to control an exhaust gas temperature based on whether a selective catalytic reduction ("SCR") device is above a light-off temperature.

BACKGROUND

The exhaust gas emitted from an internal combustion engine, particularly a diesel engine, is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter ("PM"). Catalyst compositions, typically disposed on catalyst supports or substrates, are provided in an engine exhaust system to convert certain, or all of these exhaust constituents into non-regulated exhaust gas components.

One type of exhaust treatment technology for reducing CO and HC emissions is an oxidation catalyst device ("OC"). The OC device includes a flow-through substrate and a catalyst compound applied to the substrate. The catalyst compound of the OC induces an oxidation reaction of the exhaust gases once the OC device has attained a threshold or light-off temperature. One type of exhaust treatment technology for reducing $NO_x$ emissions is a selective catalytic reduction ("SCR") device that may be positioned downstream of the OC device. The SCR device includes a substrate, having a SCR catalyst compound applied to the substrate. A reductant is typically sprayed into hot exhaust gases upstream of the SCR device. The reductant may be a urea solution that decomposes to ammonia ("$NH_3$") in the hot exhaust gases and is absorbed by the SCR device.

The ammonia and the $NO_x$ in the exhaust gas are converted into an intermediate such as, for example, ammonium nitrate ("$NH_4NO_3$") that is stored on the SCR device until the SCR device attains a threshold or light-off temperature. After light off, the ammonia reduces the $NO_x$ to either nitrogen or nitrous oxide ("$N_2O$") in the presence of the SCR catalyst. When the intermediate decomposes, if more nitrogen oxide ("NO") is present in the exhaust gas than nitrogen dioxide ("$NO_2$"), then the intermediate decomposes into nitrogen. If more nitrogen dioxide is present in the exhaust gas than nitrogen oxide, then the intermediate decomposes into nitrous oxide. However, nitrous oxide is a greenhouse gas. Accordingly, it is desirable to provide an efficient approach for limiting the amount of $NO_x$ that is reduced into nitrous oxide by the SCR catalyst.

SUMMARY OF THE INVENTION

In one exemplary embodiment of the invention, an exhaust gas treatment system for an internal combustion engine is provided having an exhaust gas conduit, an oxidation catalyst ("OC") device, a selective catalytic reduction ("SCR") device, and a control module. The internal combustion engine has at least one operating parameter. The exhaust gas conduit is in fluid communication with, and is configured to receive an exhaust gas from the internal combustion engine. The exhaust gas contains oxides of nitrogen ("$NO_x$") and hydrocarbons. The exhaust gas includes an exhaust gas temperature. The OC device is in fluid communication with the exhaust gas conduit, and is activated to induce oxidation of the hydrocarbons in the exhaust gas. The OC device has an oxidation catalyst compound disposed thereon that is selectively activated at a specified temperature range for converting nitrogen oxide ("NO") to nitrogen dioxide ("$NO_2$") at a specified percentage. The SCR device is in fluid communication with the exhaust gas conduit and is configured to receive the exhaust gas. The SCR device is located downstream of the OC device. The SCR device is selectively heated to a SCR light-off temperature. The overall temperature of the SCR device is represented by a SCR temperature profile. The control module is in communication with the internal combustion engine and the exhaust gas treatment system. The control module includes control logic for determining the SCR temperature profile and determining if the SCR device is above the SCR light-off temperature based on the SCR temperature profile. The control module includes control logic for monitoring an OC device temperature of the OC device. The control module includes control logic for determining if the OC device is operating at the specified temperature range based on the OC device temperature. The control module includes control logic for adjusting at least one operating parameter of the internal combustion engine for controlling the exhaust gas temperature such that the OC device is not operating within the specified temperature range. The at least one parameter of the internal combustion engine is adjusted if the SCR device is above the light-off temperature and if the OC device is operating at the specified temperature range The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
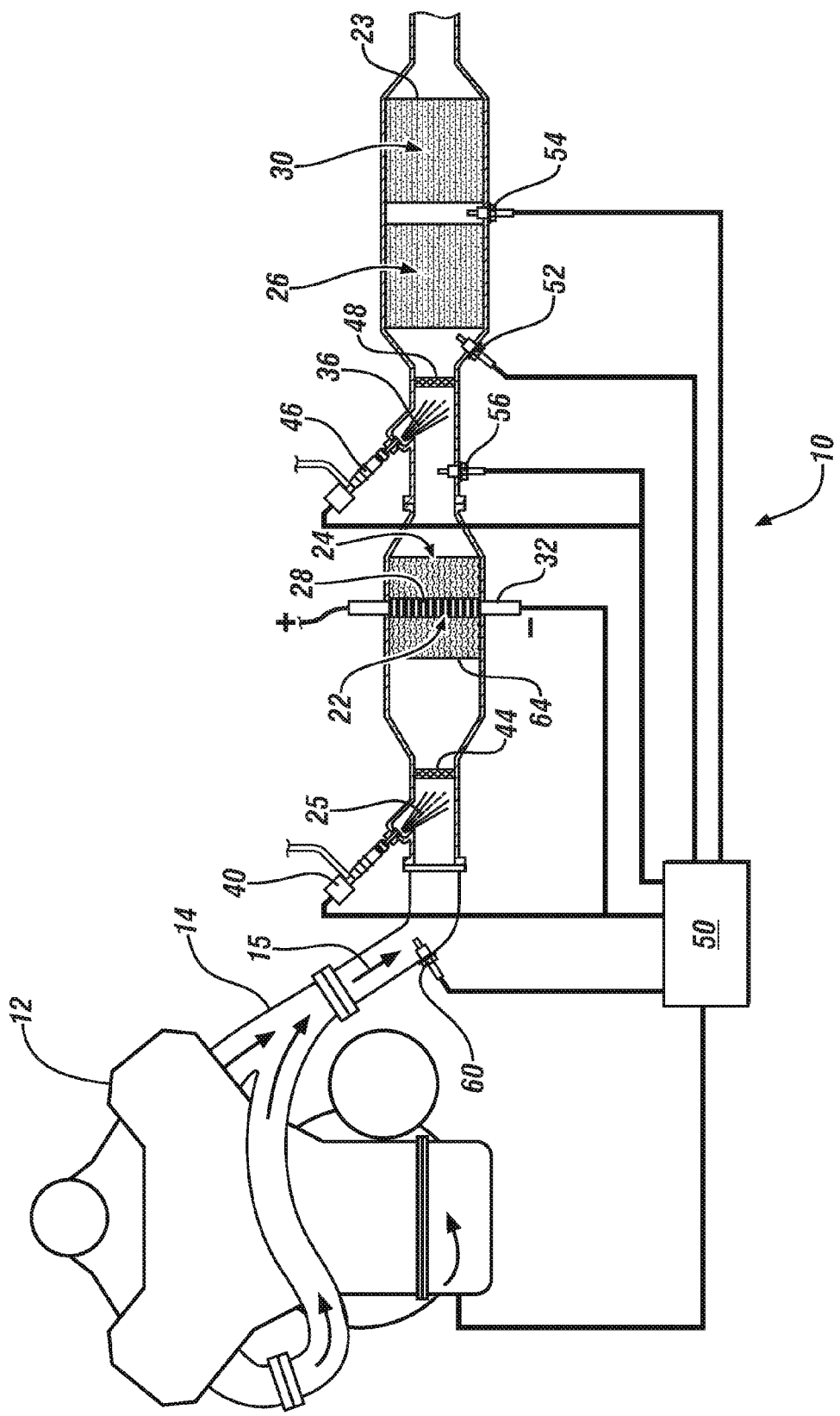
FIG. 1 is a schematic diagram of an exemplary exhaust gas treatment system.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary embodiment is directed to an exhaust gas treatment system 10, for the reduction of regulated exhaust gas constituents of an internal combustion (IC) engine 12. The exhaust gas treatment system described herein can be implemented in various engine systems that may include, but are not limited to, diesel engine systems, gasoline engine systems, and homogeneous charge compression ignition engine systems.

The exhaust gas treatment system 10 generally includes one or more exhaust gas conduits 14, and one or more exhaust treatment devices. In the embodiment as illustrated, the exhaust gas treatment system devices include an electrically heated catalyst ("EHC") device 22, an oxidation catalyst device ("OC") 24, a selective catalytic reduction device ("SCR") 26, and a particulate filter device ("PF") 30. As can be appreciated, the exhaust gas treatment system of the present disclosure may include various combinations of one or more of the exhaust treatment devices shown in FIG. 1, and/or other exhaust treatment devices (not shown), and is not limited to the present example.

In FIG. 1, the exhaust gas conduit 14, which may comprise several segments, transports exhaust gas 15 from the IC engine 12 to the various exhaust treatment devices of the exhaust gas treatment system 10. The OC device 24 may include, for example, a flow-through metal or ceramic monolith substrate that may be packaged in a stainless steel shell or canister having an inlet and an outlet in fluid communication with exhaust gas conduit 14. The substrate can include an oxidation catalyst compound disposed thereon. The oxidation catalyst compound may be applied as a wash coat and may contain metals such as platinum ("Pt"), palladium ("Pd"), perovskite or other suitable oxidizing catalysts, or combination thereof. The OC device 24 treats unburned gaseous and non-volatile HC and CO, which are oxidized to create carbon dioxide and water.

An HC or fuel injector 40 may be located upstream of the OC device 24 in fluid communication with the exhaust gas 15 in the exhaust gas conduit 14. The fuel injector 40 is in fluid communication with an HC supply (not shown), and is configured to introduce an unburned HC 25 into the exhaust gas stream for delivery to the OC device 24. A mixer or turbulator 44 may also be disposed within the exhaust conduit 14, in close proximity to the HC injector 40, to further assist in thorough mixing of the HC 25 with the exhaust gas 15 to create an exhaust gas and hydrocarbon mixture.

In the embodiment as illustrated, the EHC device 22 is disposed within the OC device 24. The EHC device 22 includes a monolith 28 and an electrical heater 32, where the electrical heater 32 is selectively activated and heats the monolith 28. The electrical heater 32 is connected to an electrical source (not shown) that provides power thereto. In one embodiment, the electrical heater 32 operates at a voltage of about 12-24 volts and at a power range of about 1-3 kilowatts, however it is understood that other operating conditions may be used as well. The EHC device 22 may be constructed of any suitable material that is electrically conductive such as a wound or stacked metal monolith 28. An oxidation catalyst compound (not shown) may be applied to the EHC device 22 as a wash coat and may contain metals such as Pt, Pd, perovskite or other suitable oxidizing catalysts, or combination thereof.

The SCR device 26 may be disposed downstream of the OC device 24. In a manner similar to the OC device 24, the SCR device 26 may include, for example, a flow-through ceramic or metal monolith substrate that may be packaged in a stainless steel shell or canister having an inlet and an outlet in fluid communication with the exhaust gas conduit 14. The substrate may include an SCR catalyst composition applied thereto. The SCR catalyst composition may contain a zeolite and one or more base metal components such as iron ("Fe"), cobalt ("Co"), copper ("Cu") or vanadium ("V") which can operate efficiently to convert $NO_x$ constituents in the exhaust gas 15 in the presence of a reductant such as ammonia ("$NH_3$").

In the example as shown in FIG. 1, an ammonia reductant 36 may be supplied from a reductant supply source (not shown) and may be injected into the exhaust gas conduit 14 at a location upstream of the SCR device 26 using an injector 46, or other suitable method of delivery of the reductant to the exhaust gas 15. The reductant 36 may be in the form of a gas, a liquid, or an aqueous urea solution and may be mixed with air in the injector 46 to aid in the dispersion of the injected spray. A mixer or turbulator 48 may also be disposed within the exhaust conduit 14 in close proximity to the injector 46 to further assist in thorough mixing of the reductant 36 with the exhaust gas 15. Alternatively, instead of an injector, a passive ammonia system may be used, where a three-way catalyst (not shown) is placed upstream of the SCR device 26, and rich engine operation generates ammonia on the three-way catalyst.

The PF device 30 may be disposed downstream of the SCR device 26. The PF device 30 operates to filter the exhaust gas 15 of carbon and other particulates. In various embodiments, the PF device 30 may be constructed using a ceramic wall flow monolith filter 23 that may be packaged in a shell or canister constructed of, for example, stainless steel, and that has an inlet and an outlet in fluid communication with exhaust gas conduit 14. The ceramic wall flow monolith filter 23 may have a plurality of longitudinally extending passages that are defined by longitudinally extending walls. The passages include a subset of inlet passages that have an open inlet end and a closed outlet end, and a subset of outlet passages that have a closed inlet end and an open outlet end. Exhaust gas 15 entering the filter 23 through the inlet ends of the inlet passages is forced to migrate through adjacent longitudinally extending walls to the outlet passages. It is through this wall flow mechanism that the exhaust gas 15 is filtered of carbon and other particulates. The filtered particulates are deposited on the longitudinally extending walls of the inlet passages and, over time, will have the effect of increasing the exhaust gas backpressure experienced by the engine 12. It is appreciated that the ceramic wall flow monolith filter is merely exemplary in nature and that the PF device 30 may include other filter devices such as wound or packed fiber filters, open cell foams, sintered metal fibers, etc.

A control module 50 is operably connected to and monitors the engine 12 and the exhaust gas treatment system 10 through a number of sensors. The control module 50 is also operably connected to the electrical heater 32 of the EHC device 22, the engine 12, the fuel injector 40 and the reductant injector 46. FIG. 1 illustrates the control module 50 in communication with three temperature sensors 52, 54 and 56 located in the exhaust gas conduit 14. The first temperature sensor 52 is situated upstream of the SCR device 26, and the second temperature sensor 54 is located downstream of the SCR device 26. The third temperature sensor 56 is located downstream of the OC device 24. The temperature sensors 52, 54, and 56 send electrical signals to the control module 50 that each indicate the temperature in the exhaust gas conduit 14 in specific locations. The control module 50 is also in communication with a $NO_x$ sensor 60 that is in fluid communication with the exhaust gas conduit 14. Specifically, the $NO_x$ sensor 60 is located downstream of the internal combustion engine 12 to detect a $NO_x$ concentration level at the exit of the engine 12.

The control module 50 includes control logic for monitoring the first temperature sensor 52 and the second temperature sensor 54 and for calculating a temperature profile of the SCR device 26. Specifically, the first temperature sensor 52 and the second temperature sensor 54 are averaged together to create the temperature profile of the SCR device 26. The control module 50 also includes control logic for determining the temperature of the OC device 24 based on the third temperature sensor 56.

The control module 50 includes control logic for continuously adjusting the operating parameters of the engine 12 such as, for example, fuel injection timing and fuel quantity, for controlling the exhaust gas 15 temperature. Specifically, the control module 50 includes control logic for adjusting the operating parameters of the engine 12 based on the temperature profile of the SCR device 26 and the temperature of the OC device 24. After a cold start of the engine 12, the SCR device 26 is heated to a light-off or minimum operating temperature, which generally effectively reduces the amount of $NO_x$ in the exhaust gas 15. Immediately after the SCR device 26 attains the light-off temperature, then the control module 50 includes control logic for monitoring the temperature of the OC device 24 based on the temperature sensor 56. The control module 50 further includes control logic for determining if the OC device is operating within a specified temperature range.

Figure 2:
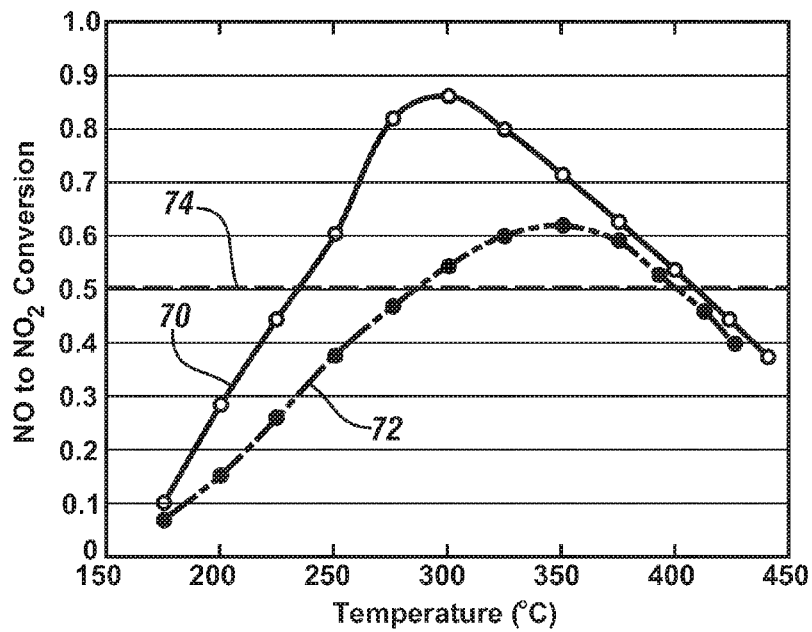
FIG. 2 is a graph illustrating several types of oxidization catalyst compounds for an OC device shown in FIG. 1.

In the event the OC device 24 is operating within the specified temperature range, the control module 50 includes control logic for modifying the operating parameters of the engine 12 to adjust the temperature of the OC device 24. As discussed above, in one embodiment the oxidation catalyst compound applied to both the EHC device 22 and the OC device 24 may contain metals such as Pt, Pd, or perovskite. These types of oxidation catalysts convert NO to $NO_2$ at or above a specified percentage when the OC device 24 is operating within the specified temperature range. Thus, the control module 50 may adjust the temperature of the exhaust gas temperature 15 such that the OC device 24 does not operate within the specified temperature range. FIG. 2 is a graph illustrating an exemplary embodiment of NO to $NO_2$ conversion versus temperature for an OC device with a perovskite washcoat, which is indicated by reference number 70, and an OC device with a platinum washcoat, which is indicated by reference number 72.

The specified temperature range represents the temperatures where the OC device 24 (shown in FIG. 1) generally converts of NO to $NO_2$ at a specified percentage of at least about fifty percent, which corresponds to the dashed line 74 shown in FIG. 2. The dashed line 74 corresponds with the conversion of NO to $NO_2$ at a specified percentage of at least about fifty percent, or 0.5 as shown in FIG. 2. Therefore, a greater amount of $NO_2$ will be present in the exhaust gas 15 when compared to NO if the OC device 24 is operating within the specified temperature range. For example, in the embodiment as shown in FIG. 2, the perovskite washcoat 70 generally converts of NO to $NO_2$ at a specified percentage of at least about fifty percent at a specified temperature range of about 235° C. to about 400° C. The platinum washcoat 72 generally converts NO to $NO_2$ at a specified percentage of at least about fifty percent a specified temperature range of about 280° C. to about 400° C.

Referring now to FIGS. 1-2, the majority of $NO_x$ emitted from the engine 12 is in the form of NO, however it should be noted that $NO_2$ is more easily adsorbed than NO by the SCR device 26 prior to light-off. Thus, prior to light-off of the SCR device 26, a greater amount of $NO_2$ in the exhaust gas 15 is generally provided to the SCR device 26 when compared to NO. That is, the control module 50 includes control logic for controlling the temperature of the exhaust gas 15 before the SCR device 26 attains the light-off temperature such that the OC device 24 operates within the specified temperature range. Providing a greater amount of $NO_2$ prior to light-off of the SCR device 26 may facilitate or improve the reduction of $NO_x$ in the exhaust gas 15 once the SCR device 26 is heated to the light-off temperature.

The reductant 36 and the $NO_x$ in the exhaust gas are converted into an intermediate such as, for example, ammonium nitrate ("$NH_4NO_3$") that is stored on the SCR device 26. After the SCR device 26 attains the light-off temperature, the intermediate is decomposed into nitrogen or nitrous oxide ("$N_2O$"). Specifically, when the intermediate decomposes, if more nitrogen oxide ("NO") is present in the exhaust gas than nitrogen dioxide ("$NO_2$"), then the intermediate decomposes into nitrogen. If more nitrogen dioxide is present in the exhaust gas than nitrogen oxide, then the intermediate decomposes into nitrous oxide. Thus, immediately after light-off of the SCR device 26, the control module 50 includes control logic for adjusting the operating parameters of the engine 12 to control the exhaust gas 15 temperature such that the OC device 24 is not operating within the specified temperature range. For example, referring to FIG. 2, if the platinum washcoat 72 is used, the control module 50 would adjust the operating parameters of the engine 12 such that the OC device 24 (shown in FIG. 1) would not generally operate at temperatures ranging from about 280° C. to about 400° C. That is, in one approach employing the platinum washcoat 72, the control module 50 would adjust the operating parameters of the engine 12 such that the OC device 24 operates at temperatures below about 280° C. Alternatively, in another approach, the operating parameters of the engine 12 may be modified such that the OC device 24 operates at temperatures above 400° C., however, operating the engine at cooler temperatures results in improved fuel economy of the engine 12.

In addition to modifying the operating parameters of the engine 12, the control module 50 includes control logic for selectively activating the EHC device 22 to control the temperature of the exhaust gas 15. The EHC device 22 is activated or deactivated based on the temperature profile of the SCR device 26 as well the temperature of the OC device 24. In one embodiment, if the temperature profile of the SCR device 26 is above the light-off temperature, then the electrical heater 32 is deactivated, and no longer heats the EHC device 22. However, as long as the temperature profile of the SCR device 22 is below the light-off temperature the electrical heater 32 is activated or remains activated, and heat is provided to the SCR device 26. Deactivating the EHC device 22 will contribute to a decrease in temperature of the OC device 24, and facilitates operation of the OC device 24 below the specified temperature range.

In addition to modifying the operating parameters of the engine 12 and activating or deactivating the EHC device 22, the control module 50 includes control logic for selectively activating the fuel injector 40 to introduce the HC 25 into the exhaust gas 15 as well. Introducing the HC 25 into the exhaust gas 15 will increase the temperature of the exhaust gas 15. Therefore, in one embodiment if the temperature profile of the SCR device 26 is above the light-off temperature, then the control module 50 includes control logic for deactivating the fuel injector 40. Deactivating the fuel injector 40 will in turn cause the OC device 24 to drop below the specified temperature range.

The control module 50 also includes control logic for monitoring the temperature of the EHC device 22. Specifically, the control module 50 may monitor the temperature of the EHC device 22 by several different approaches. In one approach, a temperature sensor (not shown) is placed downstream of the EHC device 22 and is in communication with the control module 50 for detecting the temperature of the EHC device 22. In an alternative approach, the temperature sensor is omitted, and instead the control module 50 includes control logic for determining the temperature of the EHC device 22 based on operating parameters of the exhaust gas system 10. Specifically, the temperature of the EHC device 22 may be calculated based on the exhaust flow of the engine 12, an input gas temperature of the engine 12, and the electrical power provided to the electrical heater 32. The exhaust flow of the engine 12 is calculated by adding the intake air mass of the engine 12 and the fuel mass of the engine 12, where the intake air mass is measured using an intake air mass flow sensor (not shown) of the engine 12, which measures air mass flow entering the engine 12. The fuel mass flow is measured by summing the total amount of fuel injected into the engine 12 over a given period of time. The fuel mass flow is added to the air mass flow rate to calculate the exhaust flow of the engine 12.

The control module 50 includes control logic for determining if the temperature of the EHC device 22 is above a threshold or EHC light-off temperature. In one exemplary embodiment, the EHC light-off temperature is about 250° C. If the temperature of the EHC device 22 is above the EHC light-off temperature, then the control module 50 includes control logic for de-energizing an electrical source (not shown) of the electrical heater 32.

The control module 50 also includes control logic for determining if the SCR device 26 has an intermediate (e.g., NH$_4$NO$_3$) stored on the SCR device 26. Specifically, the control module 50 includes control logic for determining the presence of an intermediate, if any, that is stored on the SCR device 26. The presence of the intermediate on the SCR device 26 may be based on the amount of NO$_x$ in the exhaust gas 15 at the exit of the engine 12 and the amount of reductant 36 that has been released by the reductant injector 46 into the exhaust gas 15. The control module 50 also includes control logic for activating the reductant injector 46 in the absence of intermediates on the SCR device 26.

The EHC device 22 is also positioned downstream of a front face 64 of the OC device 24 such that hydrocarbons in the exhaust gas 15 do not substantially interfere with the generation of NO to NO$_2$ by the EHC device 22. Specifically, the OC device 24 is employed in an effort to treat unburned gaseous and non-volatile HC and CO upstream of the EHC device 22. Hydrocarbons in the exhaust gas 15 may interfere with the conversion of NO to NO$_2$ by the EHC device 22. Thus, the placement of the OC device 24 upstream of the EHC device 22 facilitates reducing the amount of NO$_x$ in the exhaust gas 15 by reducing or substantially eliminating hydrocarbons that interfere with NO$_2$ generation.

Figure 3:
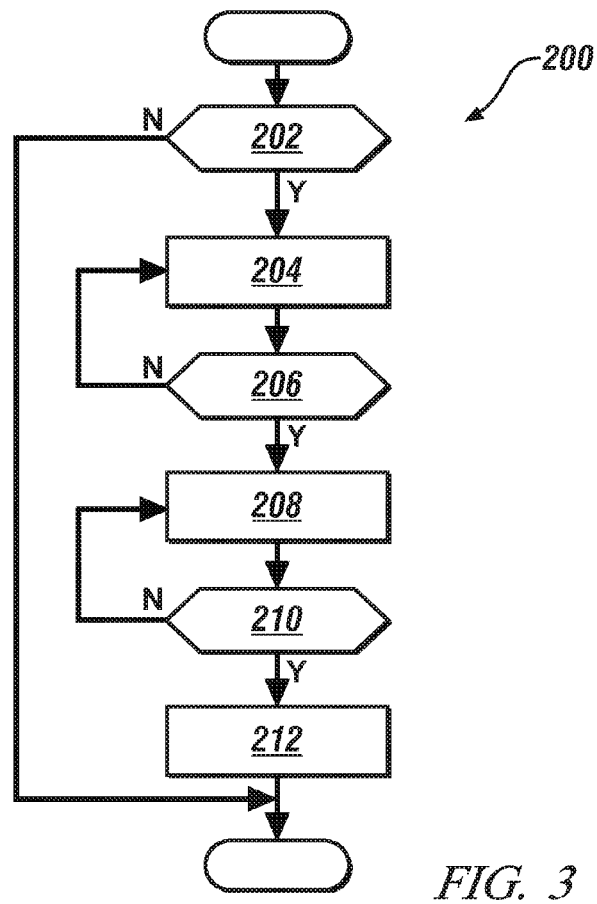
FIG. 3 is a process flow diagram illustrating a method of operating the exhaust gas treatment system shown in FIG. 1.

A method of operating the exhaust gas treatment system 10 will now be explained. Referring to FIG. 3, an exemplary process flow diagram illustrating an exemplary process of operating the exhaust gas treatment system 10 is generally indicated by reference number 200. Process 200 begins at step 202, where a control module 50 includes control logic for determining the presence of an intermediate, if any, stored on an SCR device 26. With reference to FIG. 1, a reductant 36 and the NO$_x$ in the exhaust gas are converted into an intermediate such as, for example, ammonium nitrate ("NH$_4$NO$_3$") that is stored on the SCR device 26. In the event that no intermediate is present on the SCR device 26, process 200 may terminate. In the event the control module 50 determines the intermediate is stored on the SCR device 26, process 200 may then proceed to step 204.

In step 204, the control module 50 includes control logic for monitoring the temperature profile of the SCR device 26. Specifically, referring to FIG. 1, the control module 50 includes control logic for monitoring a first temperature sensor 52 and a second temperature sensor 54 and for calculating a temperature profile of the SCR device 26. Specifically, the first temperature sensor 52 and the second temperature sensor 54 are averaged together to create the temperature profile of the SCR device 26. Process 200 may then proceed to step 206.

In step 206, the control module 50 includes control logic for determining if the SCR device 26 is above a light-off temperature. In the event the SCR device 26 has not attained the light-off temperature, then process 200 returns to step 204. In the event the SCR device 26 has reached the light-off temperature, then process 200 may proceed to step 208.

In step 208, includes control logic for determining a temperature of an OC device 24. For example, in the embodiment as shown in FIG. 1, the control module 50 includes control logic for determining the temperature of the OC device 24 based on a third temperature sensor 56. Process 200 may then proceed to step 210.

In step 210, the control module 50 further includes control logic for determining if the OC device is operating within a specified temperature range. The specified temperature range represents the temperatures where the OC device 24 (shown in FIG. 1) generally converts of NO to NO$_2$ at a specified percentage of at least about fifty percent. In the event the OC device 24 is not operating within the specified temperature range, process 200 may return to step 208. In the event the OC device 24 is operating within the specified temperature range, then process 200 may proceed to step 212.

In step 212, the control module 50 includes control logic for modifying the operating parameters of the engine 12 to adjust the temperature of the OC device 24. That is, the control module 50 adjusts the exhaust gas temperature 15 such that the OC device 24 does not operate at the specified temperature range. In addition to modifying the operating parameters of the engine 12, in one exemplary embodiment, the control module 50 may also include control logic for selectively activating or deactivating an EHC device 22 to control the temperature of the exhaust gas 15. In addition to modifying the operating parameters of the engine 12 and activating or deactivating the EHC device 22, the control module 50 may also include control logic for selectively activating a fuel injector 40 to introduce an HC 25 into the exhaust gas 15 as well. Process 200 may then terminate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust gas treatment system for an internal combustion engine, the internal combustion engine having at least one operating parameter, comprising:

an exhaust gas conduit in fluid communication with, and configured to receive an exhaust gas from the internal combustion engine, the exhaust gas containing oxides of nitrogen ("NO$_x$") and hydrocarbons, the exhaust gas having an exhaust gas temperature;

an oxidation catalyst ("OC") device in fluid communication with the exhaust gas conduit, the OC device activated to induce oxidation of hydrocarbons in the exhaust gas, the OC device having an oxidation catalyst compound disposed thereon that is selectively activated at a specified temperature range for converting nitrogen oxide ("NO") to nitrogen dioxide ("$NO_2$") at a specified percentage;

a selective catalytic reduction ("SCR") device in fluid communication with the exhaust gas conduit and configured to receive the exhaust gas, the SCR device located downstream of the OC device, wherein the SCR device is selectively heated to a SCR light-off temperature, and wherein the overall temperature of the SCR device is represented by a SCR temperature profile; and a control module in communication with the internal combustion engine and the exhaust gas treatment system, comprising:

a control logic for monitoring the SCR temperature profile;

a control logic for determining if the SCR device is above the SCR light-off temperature based on the SCR temperature profile;

a control logic for monitoring an OC device temperature of the OC device;

a control logic for determining if the OC device is operating at the specified temperature range based on the OC device temperature; and a control logic for adjusting at least one operating parameter of the internal combustion engine for controlling the exhaust gas temperature such that the OC device is not operating within the specified temperature range, wherein the at least one parameter of the internal combustion engine is adjusted if the SCR device is above the light-off temperature and if the OC device is operating at the specified temperature range.

2. The exhaust gas treatment system as recited in claim 1, wherein the specified percentage for converting nitrogen oxide to nitrogen dioxide is at least about fifty percent.

3. The exhaust gas treatment system as recited in claim 1, wherein the control module includes control logic for increasing the exhaust gas temperature above the specified temperature range if the SCR device is above the light-off temperature.

4. The exhaust gas treatment system as recited in claim 1, wherein the control module includes control logic for decreasing the exhaust gas temperature below the specified temperature range if the SCR device is above the light-off temperature.

5. The exhaust gas treatment system as recited in claim 1, further comprising an electrically heated catalyst ("EHC") device in fluid communication with the exhaust gas conduit and configured to receive the exhaust gas, wherein the EHC device is located within the OC device and is selectively activated to produce heat and induce further oxidation of the exhaust gas.

6. The exhaust gas treatment system as recited in claim 5, wherein the EHC device has an EHC oxidation catalyst compound disposed thereon for converting nitrogen oxide to nitrogen dioxide at the specified percentage at the specified temperature range, wherein the EHC device is positioned downstream of the front face of the OC device such that hydrocarbons in the exhaust gas do not substantially interfere with the generation of nitrogen dioxide by the EHC device.

7. The exhaust gas treatment system as recited in claim 5, wherein the control module is in communication with the EHC device, and wherein the control module includes control logic for deactivating the EHC device if the SCR device is above the light-off temperature.

8. The exhaust gas treatment system as recited in claim 5, wherein at least one of the oxidation catalyst compound of the OC device and the EHC oxidation catalyst compound of the EHC device is one of palladium, platinum, and perovskite.

9. The exhaust gas treatment system as recited in claim 1, wherein the SCR device is in communication with and receives and stores reductant from a reductant source.

10. The exhaust gas treatment system as recited in claim 9, further comprising $NO_x$ sensor that is in fluid communication with the exhaust gas conduit, the $NO_x$ sensor located downstream of the internal combustion engine to detect a $NO_x$ concentration level at an exit of the engine.

11. The exhaust gas treatment system as recited in claim 10, wherein the control module includes control logic for determining a presence of an intermediate on the SCR device, wherein the presence of the intermediate on the SCR device is based on the $NO_x$ concentration level at the exit of the engine and an amount of reductant that has been released by the reductant source into the exhaust gas.

12. The exhaust gas treatment system as recited in claim 11, wherein the control module includes control logic for adjusting the operating parameters of the internal combustion engine for controlling the exhaust gas temperature such that the OC device is not operating at the specified temperature range if the SCR device includes the presence of the intermediate, if the SCR device is above the light-off temperature, and if the OC device is operating at the specified temperature range.

13. The exhaust gas treatment system as recited in claim 1, comprising a hydrocarbon injector connected to and in fluid communication with the exhaust gas conduit, wherein the hydrocarbon injector is selectively activated for delivery of a hydrocarbon and formation of an exhaust gas and hydrocarbon mixture therein.

14. The exhaust gas treatment system as recited in claim 13, wherein the control module is in communication with the hydrocarbon injector, and wherein the control module includes control logic for deactivating the hydrocarbon injector if the SCR device is above the light-off temperature and if the OC device is operating at the specified temperature range.

15. The exhaust gas treatment system of claim 1, further comprising a first temperature sensor and a second temperature sensor in fluid communication with the exhaust gas conduit, the first temperature sensor situated upstream of the SCR device and the second temperature sensor situated downstream of the SCR device, wherein the control module includes control logic for monitoring the first temperature sensor and the second temperature sensor, and a control logic for calculating an SCR temperature profile based on signals from the first temperature sensor and the second temperature sensor.

16. An exhaust gas treatment system for an internal combustion engine, the internal combustion engine having at least one operating parameter, comprising:

an exhaust gas conduit in fluid communication with, and configured to receive an exhaust gas from the internal combustion engine, the exhaust gas containing oxides of nitrogen ("$NO_x$") and hydrocarbons, the exhaust gas having an exhaust gas temperature;

an oxidation catalyst ("OC") device in fluid communication with the exhaust gas conduit, the OC device activated to induce oxidation of the hydrocarbons in the exhaust gas, the OC device having an oxidation catalyst compound disposed thereon that is selectively activated at a specified temperature range for converting nitrogen oxide ("NO") to nitrogen dioxide ("$NO_2$") at a specified percentage that is at least about fifty percent;

a selective catalytic reduction ("SCR") device in fluid communication with the exhaust gas conduit and configured to receive the exhaust gas, the SCR device located downstream of the OC device, wherein the SCR device is selectively heated to a SCR light-off temperature, and wherein the overall temperature of the SCR device is represented by a SCR temperature profile; and a control module in communication with the internal combustion engine and the exhaust gas treatment system, comprising:

a control logic for monitoring the SCR temperature profile;

a control logic for determining if the SCR device is above the SCR light-off temperature based on the SCR temperature profile;

a control logic for monitoring an OC device temperature of the OC device;

a control logic for determining if the OC device is operating at the specified temperature range; and a control logic for adjusting at least one operating parameter of the internal combustion engine for controlling the exhaust gas temperature such that the OC device is below the specified temperature range, wherein the at least one parameter of the internal combustion engine is adjusted if the SCR device is above the light-off temperature and if the OC device is operating at the specified temperature range.

17. The exhaust gas treatment system as recited in claim 16, further comprising an electrically heated catalyst ("EHC") device in fluid communication with the exhaust gas conduit and configured to receive the exhaust gas, wherein the EHC device is located within the OC device and is selectively activated to produce heat and induce further oxidation of the exhaust gas.

18. The exhaust gas treatment system as recited in claim 17, wherein the control module is in communication with the EHC device, and wherein the control module includes control logic for deactivating the EHC device if the SCR device is above the light-off temperature.

19. The exhaust gas treatment system as recited in claim 16, comprising a hydrocarbon injector connected to and in fluid communication with the exhaust gas conduit, wherein the hydrocarbon injector is selectively activated for delivery of a hydrocarbon and formation of an exhaust gas and hydrocarbon mixture therein, and wherein the control module is in communication with the hydrocarbon injector, and the control module includes control logic for deactivating the hydrocarbon injector if the SCR device is above the light-off temperature and if the OC device is operating at the specified temperature range.

* * * * *